US012356515B2

(12) United States Patent
Kaji et al.

(10) Patent No.: US 12,356,515 B2
(45) Date of Patent: Jul. 8, 2025

(54) HEATER DEVICE AND IMAGING DEVICE FOR VEHICLE

(71) Applicant: TOKYO COSMOS ELECTRIC CO., LTD., Zama (JP)

(72) Inventors: Masashi Kaji, Kanagawa (JP); Takuya Karasawa, Kanagawa (JP)

(73) Assignee: TOKYO COSMOS ELECTRIC CO., LTD., Zama (JP)

( * ) Notice: Subject to any disclaimer, the term of this patent is extended or adjusted under 35 U.S.C. 154(b) by 829 days.

(21) Appl. No.: 17/632,105

(22) PCT Filed: Jul. 31, 2020

(86) PCT No.: PCT/JP2020/029429
§ 371 (c)(1),
(2) Date: Feb. 1, 2022

(87) PCT Pub. No.: WO2021/024939
PCT Pub. Date: Feb. 11, 2021

(65) Prior Publication Data
US 2022/0279627 A1 Sep. 1, 2022

(30) Foreign Application Priority Data
Aug. 2, 2019 (JP) ................. 2019-142991

(51) Int. Cl.
*H05B 3/84* (2006.01)
*G02B 27/00* (2006.01)
*H05B 1/02* (2006.01)

(52) U.S. Cl.
CPC ........... *H05B 3/84* (2013.01); *G02B 27/0006* (2013.01); *H05B 1/02* (2013.01)

(58) Field of Classification Search
CPC ...... H05B 3/84; H05B 2203/008; H05B 3/86;
H05B 2203/003; H05B 2203/011; H05B 2203/013; H05B 2203/014; H05B 2203/017; H05B 3/286; H05B 2203/02; H05B 3/18; H05B 3/20; H05B 3/267; H05B 1/02; H05B 1/023; H05B 2203/002; H05B 2203/016; H05B 3/06; H05B 3/10;
(Continued)

(56) References Cited

U.S. PATENT DOCUMENTS

| 2003/0218004 A1* | 11/2003 | Yoneyama | ............. B62D 1/065 219/544 |
| 2019/0094775 A1* | 3/2019 | Kato | .................. G03G 15/2039 |
| 2021/0155168 A1* | 5/2021 | Hirotani | ................ G09F 21/048 |

FOREIGN PATENT DOCUMENTS

JP 2017147031 A 8/2017

OTHER PUBLICATIONS

International Search Report for International Application No. PCT/JP2020/029429; Date of Mailing, Sep. 24, 2020.

\* cited by examiner

*Primary Examiner* — Vy T Nguyen
(74) *Attorney, Agent, or Firm* — CANTOR COLBURN LLP

(57) ABSTRACT

A heater device according to the present invention comprises: a first line where an electrically-heated wire is routed to a region to be heated on a transparent substrate; and a second line that is connected to first and second power supply terminals and is wider than the first line. In addition, a wire break region is formed in the second line, a thermistor is connected so as to span the wire break region, and a portion of the first line is within the wire break region.

5 Claims, 3 Drawing Sheets

(58) Field of Classification Search
CPC ........... H05B 3/14; H05B 3/146; B60R 11/04; B60R 2011/0026; B60J 1/001; B60J 1/002; B60J 1/02; G02B 27/0006; G01K 13/02; G06V 20/56; H04N 7/181; H04N 23/51; H04N 23/52; H04N 23/57
USPC ................... 219/202, 203; 348/148; 359/512
See application file for complete search history.

HEATER DEVICE AND IMAGING DEVICE FOR VEHICLE

CROSS REFERENCE TO RELATED APPLICATIONS

This is the U.S. national stage of application No. PCT/JP2020/029429, filed on Jul. 31, 2020. Priority under 35 U.S.C. § 119 (a) and 35 U.S.C. § 365 (b) is claimed from Japanese Application No. 2019-142991, filed Aug. 2, 2019, the disclosure of which is also incorporated herein by reference.

TECHNICAL FIELD

The present disclosure relates to a heater device and an imaging device for a vehicle.

BACKGROUND ART

Conventionally, a heater device that is attached to a window glass or the like of a vehicle to heat the attached object, such as the window glass (see, e.g., Patent Literature (hereinafter, referred to as "PTL") 1) has been known.

This type of heater device, for example, is used as a device for defrosting and anti-fogging the window glass of a monitoring area of an imaging device for a vehicle or an onboard radar device that monitors the outside of the vehicle through the window glass.

PTL 1 discloses a sheet-like heater device that is directly attached to a windshield of a vehicle to heat the windshield. The imaging device receives light from the outside of the vehicle through the windshield and the heater device, and captures a front image of the vehicle. This type of heater device is referred to as a sticker heater, for example.

CITATION LIST

Patent Literature

PTL 1
Japanese Patent Application Laid-Open No. 2017-147031

SUMMARY OF INVENTION

Technical Problem

In practice, as well as other heater devices, a sticker heater includes a safety device that stops the heating operation of the heating means (heating wire) when the heating means overheats abnormally for some reason. A thermal fuse or a thermistor is used as this safety device.

However, a sticker heater has a heating wire within the field of view of the imaging device as a heating means; therefore, when a thermal fuse or a thermistor is placed at the position corresponding to the heating wire, the thermal fuse or the thermistor may be captured in the captured image. Forming a heating wire thin enough to be hardly captured in a captured image is possible; however, it is impossible to form a thermal fuse and a thermistor as thin as a heating wire in practice. Accordingly, a thermal fuse and a thermistor are captured in a captured image. An image captured by an imaging device is used for traveling control of a vehicle, and thus, such an image needs to be as high quality as possible without a thermal fuse or a thermistor and/or the like captured therein.

Heretofore, a configuration for a sticker heater which is capable of preventing abnormal heating with high reliability without involving a thermistor and/or a line of its connection portion being captured in a captured image has not been sufficiently discussed.

The present disclosure has been made in view of the aforementioned problem and aims to provide a heater device and a imaging device for a vehicle which is capable of preventing abnormal heating with high reliability without involving a thermistor or a line of its connection portion being captured in a captured image.

Solution to Problem

One aspect of a heater device according to the present disclosure is a heater device having a sheet shape and affixed to one surface of a transparent member, the heater device including: a transparent substrate; a first and second power supply terminals formed on or above the transparent substrate; a heating wire formed on or above the transparent substrate and connected to the first power supply terminal at one end of the heating wire and electrically connected to the second power supply terminal at another end of the heating wire, the heating wire having a predetermined heating wiring pattern; and a thermistor detecting a temperature of the heating wire and interrupting or lowering a current of the heating wire when the temperature of the heating wire reaches a predominated temperature or greater; in which the heating wire includes a first line and a second line, the first ling being routed in a heating targeted area on the transparent substrate, the second line being connected to the first and the second power supply terminals and being wider than the first line, the second line further including a disconnection area formed in the second line, and in which the thermistor is connected so as to lay across the disconnection area, and a portion of the first line enters into the disconnection area.

One aspect of an imaging device for a vehicle, according to the present disclosure includes the heater device and an imaging device obtaining a captured image by receiving imaging light that has transmitted through the heater device.

Advantageous Effects of Invention

According to the present disclosure, it is possible to prevent abnormal heating with high reliability while preventing a thermistor or a line of its connection portion from being captured in a captured image.

DESCRIPTION OF EMBODIMENTS

Hereinafter, an embodiment will be described in detail with reference to the drawings.

Figure 1:
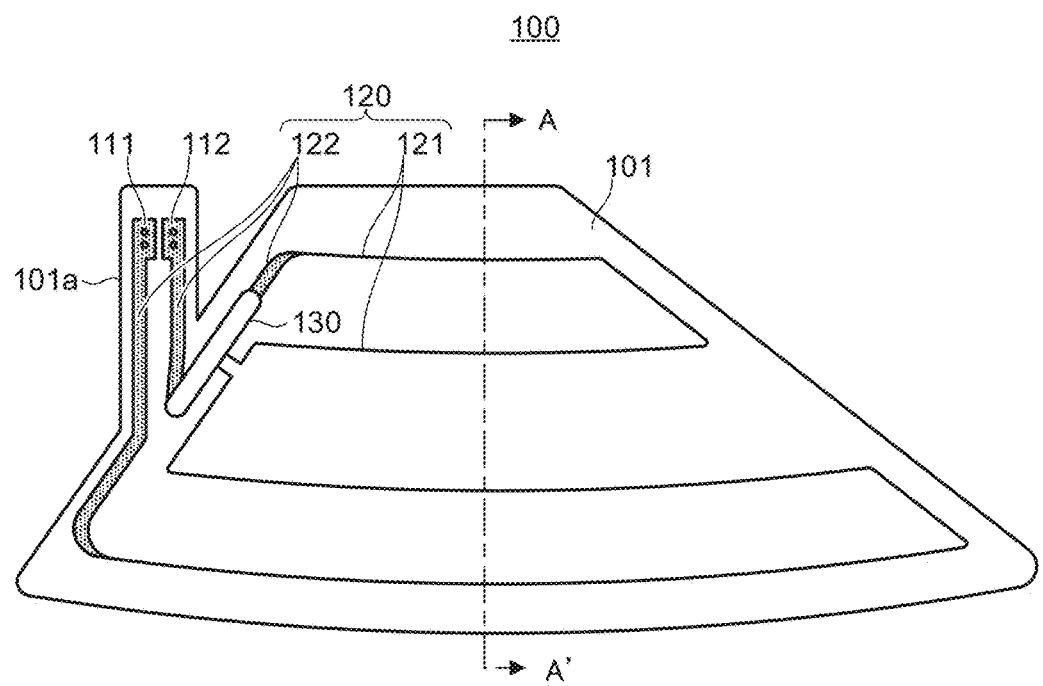
FIG. 1 is a plan view of a heater device according to an embodiment of the present disclosure.

FIG. 1 is a plan view of a heater device according to an embodiment of the present disclosure. Heater device 100 includes transparent substrate 101, power supply terminals 111 and 112, heating wire 120, and thermistor 130. Power supply terminals 111 and 112, heating wire 120, and thermistor 130 are formed on transparent substrate 101.

Transparent substrate 101 is, for example, a polyethylene terephthalate (PET) film. As transparent substrate 101, a substrate that is transparent as high as possible and has a flexibility to follow the shape of a glass surface of a vehicle is used.

Power supply terminals 111 and 112 and heating wire 120 are, for example, copper foils. A power supply line (not shown) is connected to power supply terminals 111 and 112. Power supply terminals 111 and 112 supply power from the power supply line to heating wire 120. Power supply terminals 111 and 112 and heating wire 120 are bonded to the first surface of transparent substrate 101 by an adhesive (not shown). Heating wire 120 is formed by, for example, an etching process.

Thermistor 130 detects the temperature of heating wire 120 and interrupts or lowers the current of heating wire 120 when the temperature of heating wire 120 reaches a predetermined temperature or greater. In the present embodiment, a Positive Temperature Coefficient (PTC) thermistor is used as thermistor 130. However, thermistor 130 is not limited to a PTC thermistor.

Figure 2:
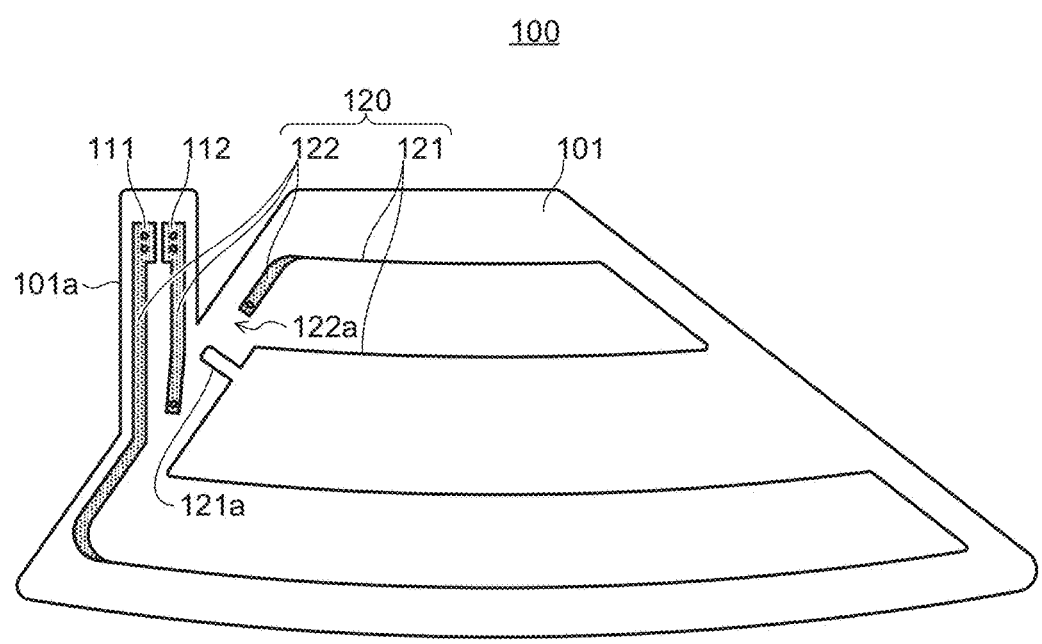
FIG. 2 is a plan view of the heater device before a thermistor is connected.

Next, the wiring pattern of heating wire 120 will be described with reference to FIG. 2. FIG. 2 is a plan view of the heater device before thermistor 130 is connected.

Heating wire 120 has one end electrically connected to the first power supply terminal 111 and the other end electrically connected to the second power supply terminal 112, and has a predetermined heating wiring pattern.

Further, heating wire 120 includes first line 121 and second line 122. First line 121 is routed in the heating targeted area on transparent substrate 101. Second line 122 is connected to the first and second power supply terminals 111 and 112. Second line 122 is wider than first line 121.

Here, second line 122 can be reliably connected to power supply terminals 111 and 112 and thermistor 130 (FIG. 1) can be connected with high reliability because second line 122 is formed widely. First line 121 is thinner than second line 122 and has a larger resistance value and a larger amount of heat generation than second line 122. Thus, first line 121 is formed in an area to be heated.

In practice, first line 121 is sufficiently thin to an extent that is not visible in the captured image. On the other hand, second line 122 is formed at the edge of transparent substrate 101 so as not to be in the imaging area of the captured image. In particular, in the present embodiment, retreating area 101a is formed on transparent substrate 101, and power supply terminals 111 and 112 and a portion of second line 122 connected to the power supply terminals are placed in the retreating area 101a. This makes sure to prevent those terminals and lines from being captured in the captured image.

Moreover, disconnection area 122a is formed in second line 122. Portion 121a of first line 121 enters into disconnection area 122a. In practice, portion 121a of first line 121 is a bent and protruding section that is first line 121 projected in the direction of disconnection area 122a.

Furthermore, as shown in FIG. 1, thermistor 130 is electrically connected to second line 122 so as to lay across disconnection area 122a in heater device 100 of the present embodiment. In this state, thermistor 130 and portion 121a of first line 121 entering into disconnection area 122a overlap with each other in the thickness direction of transparent substrate 101. In other words, disconnection area 122a is an area where two connecting portions of second line 122 to which thermistor 130 is attached are connected with each other.

Thus, thermistor 130 can detect the temperature of first line 121 in the immediate vicinity of first line 121, so that it is possible to prevent abnormal overheating of first line 121 with high reliability.

Here, the line around the portion where thermistor 130 is attached has to be wide to a certain extent for attaching thermistor 130. Moreover, since first line 121 is formed in the field of view of the imaging device, thermistor 130 has to be placed in the field of view of the imaging device to detect the temperature. This causes a problem in that the thermistor and the wide line where the thermistor is attached are captured in the captured image.

According to the configuration of this embodiment, the temperature of first line 121 can be detected very closely to first line 121, while thermistor 130 and the wide attachment portion of second line 122 are placed in the edge of transparent substrate 101 so as not to be captured in the captured image.

Figure 3:
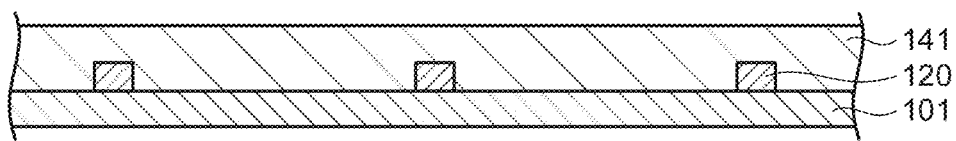
FIG. 3 is an A-A' cross sectional view of FIG. 1.

FIG. 3 is an A-A' cross sectional view of FIG. 1. Heating wire 120 is formed on the side of the first surface of transparent substrate 101, and adhesive layer 141 having transparency is formed so as to cover heating wire 120 in heater device 100.

Figure 4:
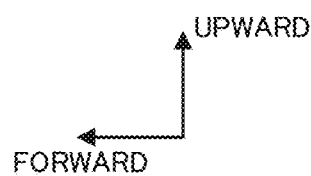
FIG. 4 is a schematic linear cross-sectional view of an example of how the hear device is mounted.
Figure 4:
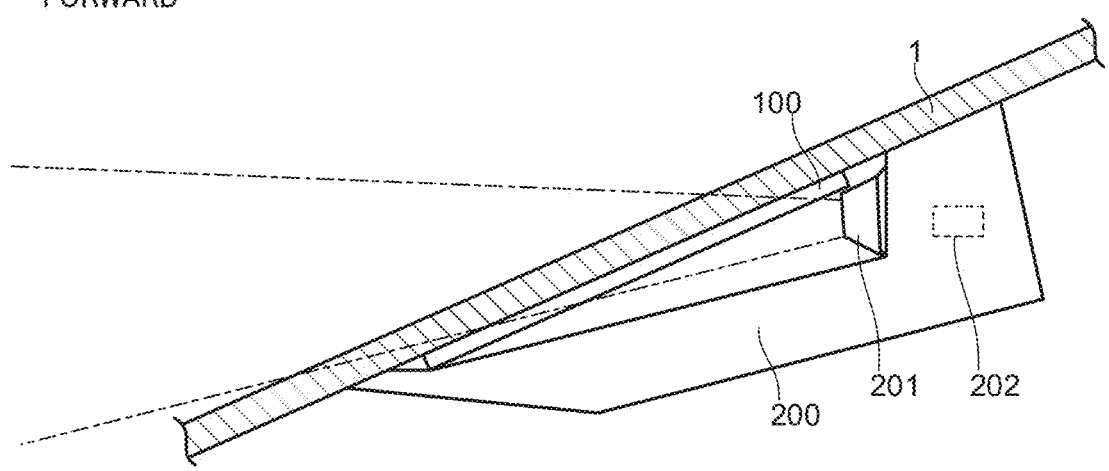

FIG. 4 is a schematic linear cross-sectional view of an example of the status in which the heater device is mounted. FIG. 4 shows the upper region of windshield 1 of the vehicle. Windshield 1 extends so as to be inclined by about 20 to 45 degrees to the horizontal direction.

Heater device 100 is adhered to windshield 1 inside the vehicle by adhesive layer 141 (FIG. 3) to defrost and anti-fog windshield 1 by heating wire 120 heated and thus warming windshield 1 and the surrounding atmosphere.

Imaging unit 200 is mounted in the position inside the vehicle corresponding to heater device 100. Imaging unit 200 includes imaging section 201 and image processor 202 processing the image captured by imaging section 201. The image of the outside of the vehicle captured by imaging unit 200 is provided, for example, to vehicle control Electric Control Unit (ECU) (not shown) for controlling the vehicle.

Heater device 100 is placed in the imaging direction of imaging section 201. Imaging section 201 receives light from the outside of the vehicle through windshield 1 and heater device 100, and captures a front image of the vehicle. Note that dashed lines in the drawing indicates an imaging area.

Heater device 100 and imaging unit 200 form an imaging device for a vehicle of this embodiment.

As described above, according to this embodiment, heater device 100 includes transparent substrate 101, power supply terminals 111 and 112, heating wire 120, and thermistor 130. Heating wire 120 includes first line 121 routed in heating targeted area on transparent substrate 101, and second line 122 connected to the first and second power supply terminals 111 and 112 and wider than first line 121. Further, disconnection area 122a is formed in second line 122, and thermistor 130 is connected so as to lay across disconnection line 122a, with portion 121a of first line 121 entering into disconnection area 122a.

Thus, it is possible to achieve heater device 100 that can prevent abnormal overheating with high reliability without involving capturing of thermistor 130 and the connecting portion of second line 122 in the captured image.

The embodiment described above merely describes an example of implementations for practicing the present invention, and should not be construed as limiting the technical scope of the present invention. That is, the present invention can be implemented in various forms without departing from the spirit or principal features of the present invention.

Figure 5:
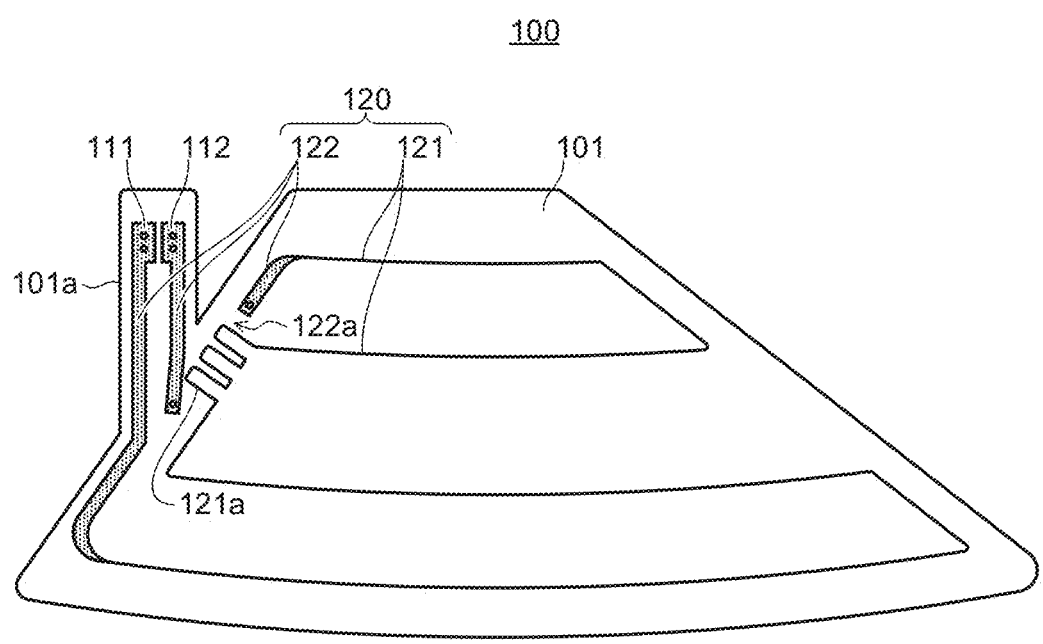
FIG. 5 is a plan view of another example of the portion of the shape of the first line entering a disconnection area.

In the above-described embodiment, portion 121a of first line 121 entering into disconnection area 122a has a protruding shape as shown in FIG. 2, but the shape of portion 121a of first line 121 entering into disconnection area 122a is not limited thereto. For example, as shown in FIG. 5, portion 121a of first line 121 may be turned back a plurality of times, which can enhance the sensitivity of the temperature detection of first line 121 by thermistor 130.

According to the embodiment described above, heater device 100 of the present invention is used as a device for reducing frost and fogging of windshield 1 of a vehicle, but the heater device of the present invention is not limited thereto. Heater device 100 of the present disclosure may be attached to, for example, a transparent plastic surface instead of a glass surface. In short, the present invention is widely applicable as a heater device for an imaging device to obtain a captured image by receiving imaging light transmitted through the heater device adhered to one surface of the transparent member.

This application is based on Japanese Patent Application No. 2019-142991 filed on Aug. 2, 2019, the disclosure of which including the specification, drawings and abstract is incorporated herein by reference in its entirety.

REFERENCE SIGNS LIST

1 Windshield
100 Heater device
101 Transparent substrate
101a Retreating area
111, 112 Power supply terminal
120 Heating wire
121 First line
121a Portion of the first line
122 Second line
122a Disconnection area
130 Thermistor
141 Adhesive layer
200 Imaging unit
201 Imaging section
202 Image processor

The invention claimed is:

1. A heater device having a sheet shape and affixed to one surface of a transparent member, the heater device comprising:
a transparent substrate;
a first and second power supply terminals formed on or above the transparent substrate;
a heating wire formed on or above the transparent substrate and connected to the first power supply terminal at one end of the heating wire and electrically connected to the second power supply terminal at another end of the heating wire, the heating wire having a predetermined heating wiring pattern; and
a thermistor detecting a temperature of the heating wire and interrupting or lowering a current of the heating wire when the temperature of the heating wire reaches a predominated temperature or greater, wherein
the heating wire includes a first line and a second line, the first line being routed in a heating targeted area on the transparent substrate, the second line being connected to the first and the second power supply terminals and being wider than the first line, the second line further including a disconnection area formed in the second line, and wherein
the thermistor is connected so as to lay across the disconnection area, and
a portion of the first line enters into the disconnection area.

2. The heater device according to claim 1, wherein the thermistor and the portion of the first line entering into the disconnection area at least partly overlap each other.

3. The heater device according to claim 1, wherein the portion of the first line entering into the disconnection area has a shape that is turned back a plurality of times.

4. An imaging device for a vehicle, comprising:
the heater device according to claim 1; and
the imaging device obtaining a captured image by receiving imaging light that has transmitted through the heater device.

5. The imaging device for the vehicle, according to claim 4, wherein
the first and the second power supply terminals, the thermistor, and the second line are formed in a position not captured in the image captured by the imaging device.

* * * * *